United States Patent [19]

Shields

[11] Patent Number: 4,966,238
[45] Date of Patent: Oct. 30, 1990

[54] HEXAGON TURF PLUGGER

[76] Inventor: Robert L. Shields, P.O. Box 164, Miltona, Minn. 56354

[21] Appl. No.: 388,952

[22] Filed: Aug. 4, 1989

Related U.S. Application Data

[63] Continuation-in-part of Ser. No. 171,304, Mar. 21, 1989, Pat. No. Des. 306,814.

[51] Int. Cl.⁵ .......................... A01B 1/24; A01B 45/04
[52] U.S. Cl. .......................... 172/19; 172/22; 294/50.7; D8/7; 30/316
[58] Field of Search .......................... 172/13, 19, 20, 21, 172/22, 371; D8/1, 7; 30/315, 316, 280, 301, 302, 361; 294/50.6, 50.7

[56] References Cited

U.S. PATENT DOCUMENTS

| D. 162,243 | 2/1951 | Simmons | D8/1 |
|---|---|---|---|
| D. 253,390 | 11/1979 | Bartholomew | D8/7 |
| D. 258,112 | 2/1981 | Klapp | D8/7 |
| D. 267,074 | 11/1982 | Feighery | D123/138.2 |
| D. 288,401 | 2/1987 | Lukomski | D8/1.6 |
| 337,329 | 3/1886 | Hewett | 30/301 |
| 917,497 | 4/1909 | Shapleigh | 30/301 |
| 1,239,316 | 9/1917 | Svendsen | D8/9 X |
| 2,210,440 | 8/1940 | Avary | 172/22 X |
| 2,458,215 | 1/1949 | Sparks | 30/302 |
| 2,612,725 | 10/1952 | Casey | 172/22 X |
| 2,686,690 | 8/1954 | Kushnir | 294/50.7 |
| 3,025,636 | 3/1962 | Warren | 47/37 |
| 3,463,238 | 8/1969 | Davies | 172/19 |
| 3,540,503 | 11/1970 | McNair | 146/6 |
| 4,606,716 | 8/1986 | McCaffrey | 30/301 X |
| 4,676,538 | 6/1987 | Fiedler | 294/50 |

OTHER PUBLICATIONS

Standard Golf Co. catalog, p. 21, Turf Plugger brochure.
Par Aide Products Co. catalog, p. 5, Woodbury Box Company brochure.

*Primary Examiner*—Randolph A. Reese
*Assistant Examiner*—Jeffrey L. Thompson
*Attorney, Agent, or Firm*—Burd, Bartz & Gutenkauf

[57] ABSTRACT

A tool for cutting hexagon turf plugs has a base secured to upright legs and a hexagon-shaped cutter. A handle is attached to the legs to facilitate moving the cutter into turf to cut a turf plug. Wedge members secured to the inside of the cutter retain a cut turf plug within the cutter. Rods and a ring attached to the base and legs cooperate with the legs and wedge members to hold stacked cut turf plugs on the tool.

29 Claims, 4 Drawing Sheets

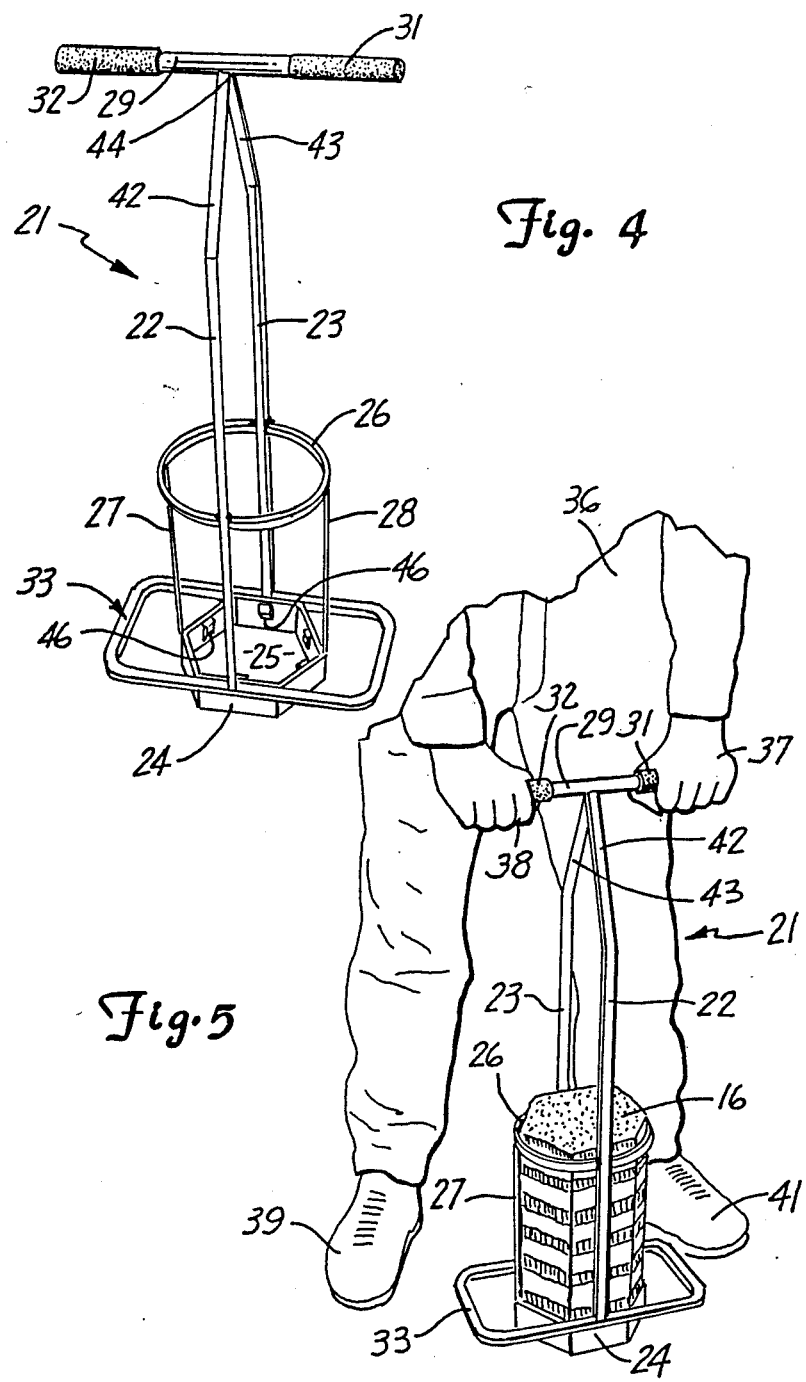

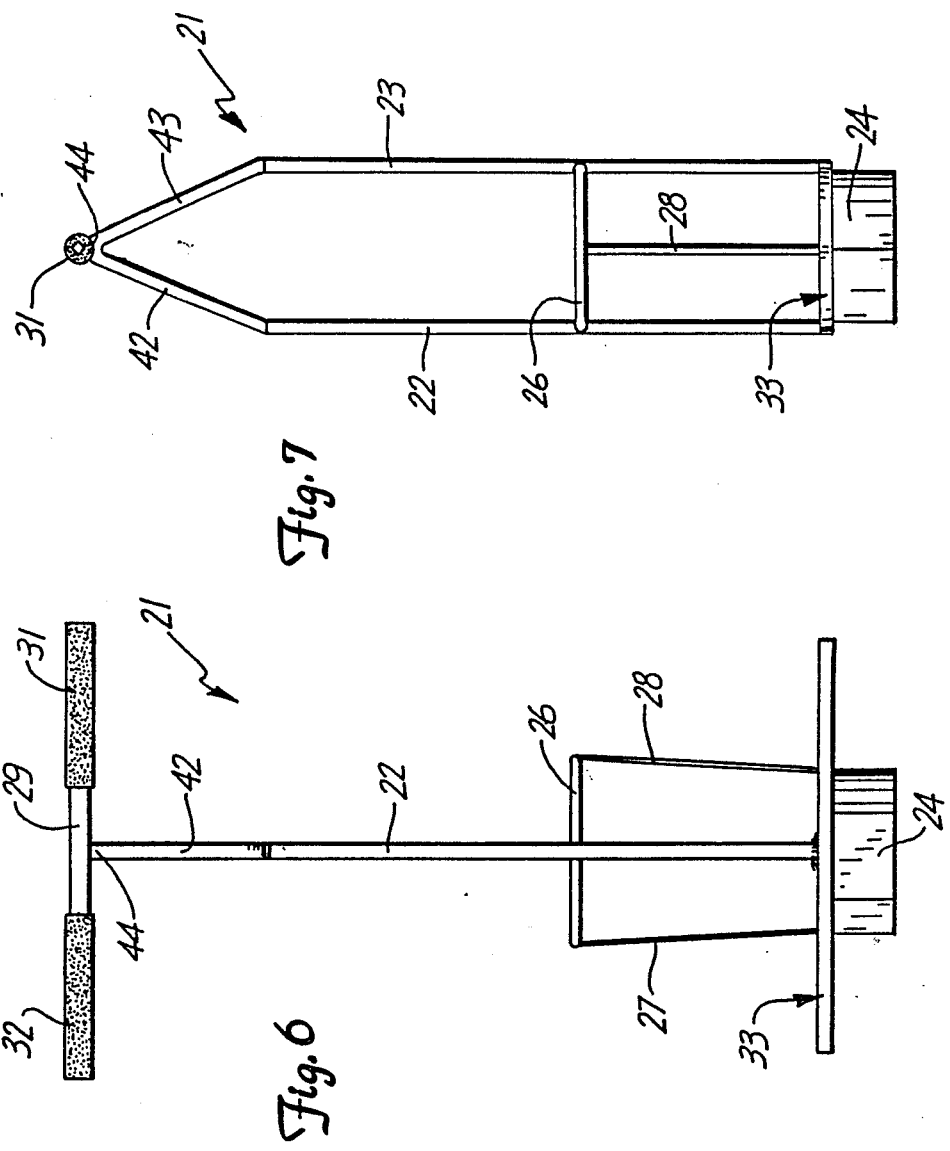

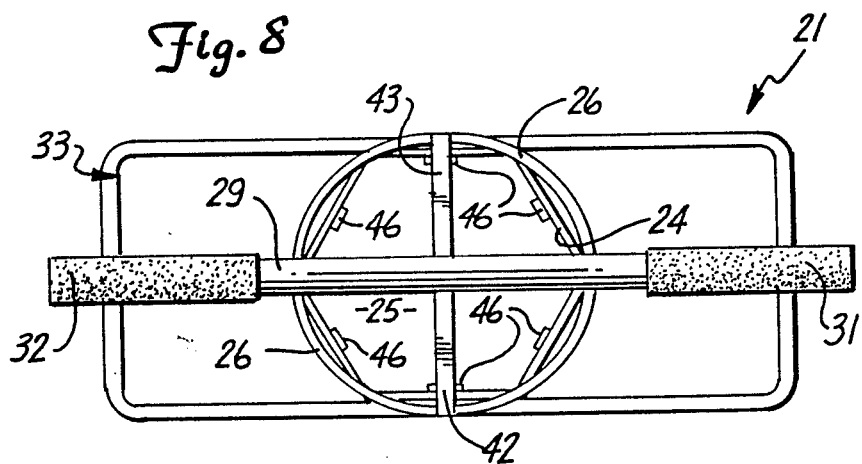
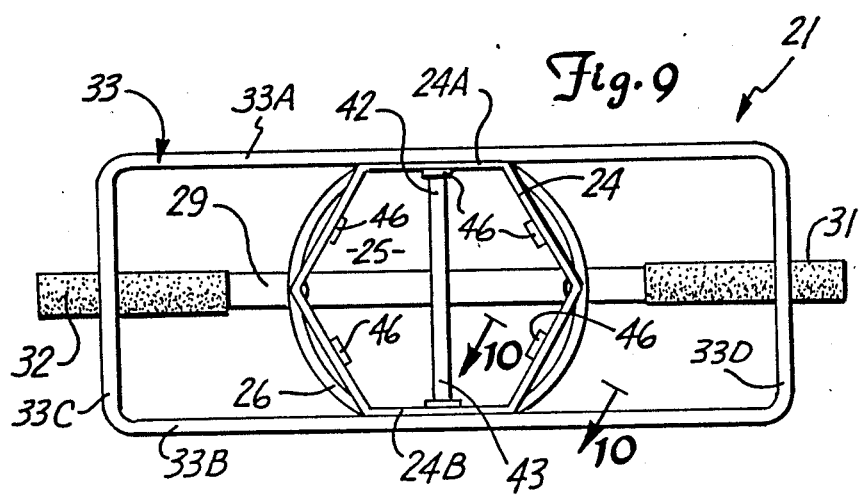
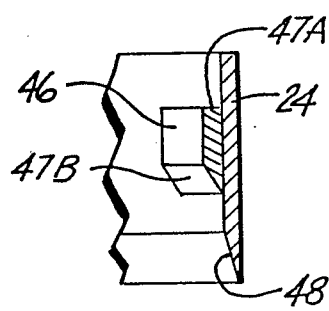

HEXAGON TURF PLUGGER

TECHNICAL FIELD

The invention to hand tools for cutting turf plugs used to repair lawns, golf course fairways and greens and like turf. The tools are hand-operated implements that cut sod into sections known as turf plugs and store a plurality of plugs that are planted to repair turf.

BACKGROUND OF INVENTION

Frequently it is necessary to replace and replant lawn and golf green sod or turf from one area to another. Turf repair is a common procedure in golf course maintenance. Turf repairing tools have been used in the past to cut sections of sod from nursery sod for replacing damaged grass areas of lawns, fairways, and golf greens. These turf repairing tools include circular cup shaped cutting blades secured to the lower end of elongated shafts. Transverse handles are attached to the top of the shafts to facilitate manual use of the tools. The tools cut circular or round turf plugs. When conventional round turf plugs are used in repairing a damaged area of turf, spaces or gaps are left in the repaired damaged section. The gaps are filled with soil or handmade pieces of sod. The circular plugs can be overlapped to close the gaps. Hand making pieces of sod and overlapping round plugs waste turf, increases turf repair time, labor, and expense. The unrepaired areas between the round plugs must be left to grow in new grass leaving the turf area with an uneven surface and a poor appearance for several weeks.

A turf repair tool that removes and replaces square portions of turf is disclosed in Woodbury Box Company, Inc. publication The tool has four cutting blades pivoted on a horizontal base. The blades can be moved downwardly into the sod to provide single square plugs. These plugs are arranged in a rectangular or square-shaped pattern to cover a damaged area of turf. The linear side and end walls of the square turf plugs engage the linear side and end walls of adjacent square plugs The linear relationship between the square turf plugs does not prevent relative linear movement or slippage of adjacent square plugs. The cartesian pattern of square plugs used to repair an area of damaged turf is easily disturbed as the plugs can move relative to each other.

SUMMARY OF INVENTION

The invention is a tool for cutting multi-sided turf plugs used to repair damaged areas of turf. The turf plugs are planted in soil in cooperating side-by-side relation with minimal space between adjacent turf plugs and an even surface having an excellent appearance. The tool has a base secured to upright legs and a multi-sided cutter The cutter includes a blade having side walls angularly related to each other. The angle between adjacent side walls is an obtuse angle. A handle is attached to the upper sections of the legs to facilitate movement of the cutter into the turf to cut a turf plug. The tool has structure to hold a plurality of stacked turf plugs.

A preferred embodiment of the turf plug cutting tool has a generally rectangular base secured to upright legs. A transverse handle is secured to the upper ends of the legs to aid in manual use of the tool. A hexagon-shaped cutting blade is secured to the base below the legs. The blade has a plurality of side walls surrounding a multi-sided opening with an open top and open bottom. Wedges secured to inside portions of the side walls allow the cutting blade to be moved into turf to cut a turf plug, locate the turf plug within the opening, and retain the turf plug within the opening as the tool is withdrawn from the turf. A turf plug retainer holds a stack of cut turf plugs. The retainer has a pair of upright rods spaced from the legs secured to a top ring. The ring has a diameter greater than the lateral distance between opposite side walls of the blade to permit upward removal of the turf plugs from the tool. The tool is sturdy in construction and durable in use. The hexagon turf plugs are planted in a soil bed in cooperating side-by-side relation. The linear sides of adjacent plugs are contiguously located, resulting in minimal space between the turf plugs. The surface of the repaired turf has an even contiguous appearance which will grow back in a short period of time.

A turf plug making tool of the invention is hereinafter described in detail. The above tool structure and advantages thereof are included in the turf plug making tool shown in the drawing and described herein.

DESCRIPTION OF DRAWING

FIG. 4 is a perspective view of the turf repair tool of the invention;

FIG. 5 is a perspective view of the turf repair tool loaded with cut hexagon turf plugs;

FIG. 6 is an enlarged side elevational view of the turf repair tool;

FIG. 7 is an end elevational view of FIG. 6;

FIG. 8 is an enlarged top view of FIG. 6;

FIG. 9 is an enlarged bottom view of FIG. 6; and

FIG. 10 is an enlarged sectional view taken along the line 10—10 of FIG. 9.

DESCRIPTION OF PREFERRED EMBODIMENT

Figure 1:
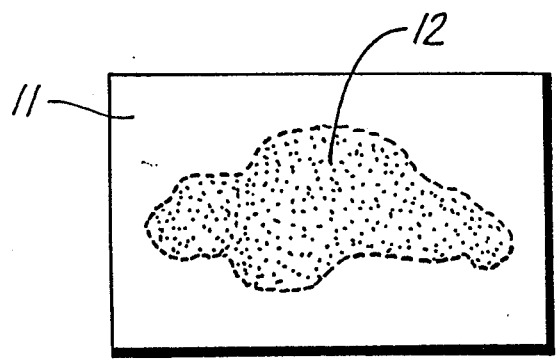
FIG. 1 is a plan view of an area of golf green turf having a damaged section.
Figure 2:
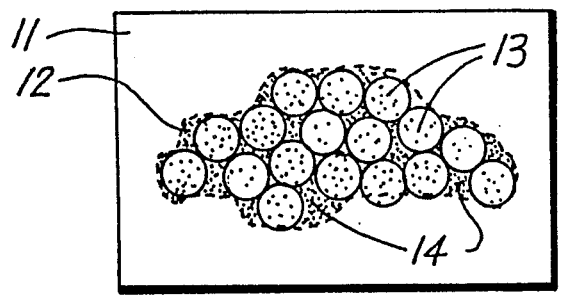
FIG. 2 is a plan view of an area of golf green turf with a damaged section repaired with round turf plugs.
Figure 3:
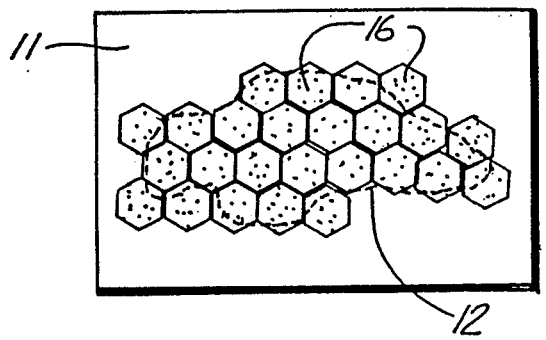
FIG. 3 is a plan view of an area of golf green turf with a damaged section repaired with hexagon turf plugs made with the turf repair tool of the invention.

Referring to FIGS. 1 to 3, there is shown an area of turf 11, such as a golf green, having a damaged section 12. Turf 11 can also be a golf fairway, lawn area, and the like. The term "turf" used herein refers to grass growing in soil and sod used to establish and repair lawns, golf course fairways and greens, and other grass areas. Conventional round turf plugs 13 can be used to repair damaged section 12. Patching the damaged section 12 with round plugs 13 leaves spaces or gaps 14 of unrepaired turf between adjacent plugs 13. The gaps 14 take several weeks to grow back whereby turf 11 is left uneven and with a poor appearance during the interim.

As shown in FIG. 3, damaged section 12 of turf area 11 can be mended using hexagon turf plugs 16. Hexagon plugs 16 have six generally flat side walls that fit closely to the side walls of adjacent hexagon plugs. The side walls have substantially the same length. An obtuse angle extends between adjacent side walls of each turf plug 16. When placed on the soil, there are minimal gaps between adjacent hexagon plugs 16 so that the turf has an even appearance which allows the repaired damaged section 12 to grow back quickly. The multi-sided or hexagon plugs 16 are anchored on each other to enable forces applied to the plugs to be distributed so that the honeycomb pattern of hexagon plugs is not easily disturbed.

Referring to FIGS. 4 to 9, there is shown the turf repair tool of the invention, indicated generally at 21. Tool 21 is used to make hexagon turf plugs 16 and hold a stack of the plugs. Tool 21 has a pair of upright legs 22 and 23 secured to a generally rectangular base or foot stand 33. Legs 22 and 23 are square tubular metal members secured by welds to opposite middle sections of base 33. Base 33 is a square tubular metal frame. Other types of materials can be used to make legs 22 and 23 and base 33. Leg 22 has an inwardly inclined upper section 42 that joins an inwardly inclined upper section 43 of leg 23 as shown at 44. A transverse tubular handle 29 is connected by a weld to the tops of legs 22 and 23. Handle 29 has a right hand grip 31 and a left hand grip 32 mounted on the ends thereof. Grips 31 and 32 are rubber or plastic tubular members fitted over opposite ends of handle 29. A plastic coating can be secured to handle 29 to provide hand grips 31 and 32.

Tool 21 has a hexagon shaped cutter or blade 24 for cutting hexagon turf plugs 16. Blade 24 has six generally vertical side walls that surround an opening 25 which has an open top and bottom allowing plugs 16 to move through blade 24. The six side walls of blade 24 are flat plate metal members joined together in a honeycomb or hexagon shape. Blade 24 can be a one-piece metal member formed into a honeycomb or hexagon shape. The side walls of blade 24 have substantially the same length and height. The lower end of each side wall of blade 24 has a knife edge 48. As shown in FIG. 9, opposite side walls 24A and 24B of blade 24 are attached to the inner surfaces of front and back bars 33A and 33B of foot stand 33. Bars 33A and 33B are joined to end bars 33C and 33D. Blade 24 extends downwardly through the central opening of stand 33. The opposite side walls 24A and 24B of blade 24 are secured to stand 33 adjacent legs 22 and 23.

As shown in FIGS. 8, 9 and 10, each side wall of blade 24 has a lower beveled edge 48. The beveled edge 48 allows plug 16 to be removed more easily from the surrounding turf 11. A plurality of wedges 46 are secured to the inner surface of blade 24. Wedges 46 each have a top lateral edge 47A and a lower outwardly and downwardly inclined edge 48B. When blade 24 is used to cut a plug 16 from a turf area 11, wedges 46 engage all sides of plug 16, thereby holding plug 16 within the open area 25 of blade 24. The top edges 47A of wedges 46 are holding steps that retain turf plug 16 within blade 24. The plug 16 is then removed from turf area 11 by lifting tool 21 away from the turf.

Referring to FIGS. 6 and 7, tool 21 has structure for holding a plurality of plugs 16 in a stacked relation. This structure includes a ring 26 attached to the middle portions of legs 22 and 23. Ring 26 has a diameter larger than the transverse distance between opposite side walls of blade 24 allowing for stacking of plugs 16 and easy removal of plugs 16 from tool 21. Support bars 27 and 28 extend upwardly between blade 24 and ring 26. As seen in FIG. 6, bars 27 and 28 taper outwardly so that the plugs 16 are free to move up between legs 22 and 23. Plugs 16 are retained in a stacked relation between legs 22 and 23 and bars 27 and 28. Plugs 16 engage the inner surfaces of legs 22 and 23 and bars 27 and 28. Legs 22 and 23 and bars 27 and 28 cooperate to hold successive plugs 16 cut from turf area 11 in a stacked relation.

In use, feet 39 and 41 of an operator 36 straddle tool 21. The operator's hands 37 and 38 are placed on grips 31 and 32 of handle 29, as shown in FIG. 5. The operator exerts a downward force on tool 21 pushing blade 24 into an area of damaged turf 12. A plurality of plugs 16 are cut and removed from the damaged turf section 12. Plugs 16 are stacked in a vertical column between legs 22 and 23 and bars 27 and 28. Feet 39 and 41 of operator 36 can be placed on foot stand 33 to apply additional force when turf area 11 is dried out and hard or otherwise difficult to cut. Blade 24 is forced into the turf area 11 until stand 33 engages the top surface of the turf. This allows turf plug cuts to be made at a consistent depth. Plugs 16 cut from the damaged turf area 12 are then discarded. The damaged turf area 12 can be cleaned and prepared for planting of new turf plugs with conventional earthworking implements.

Plugs 16 are cut from a healthy turf 11 with tool 21. The plugs 16 of healthy turf are replanted in the damaged section 12. The side walls of adjacent plugs 16 fit closely, leaving minimal gaps between adjacent plugs. The solid fit results in an even surface and allows for fast recovery and immediate good appearance of the repaired turf area. Further, the hexagon plug pattern is not easily disturbed as the engaging angular side walls of plugs 16 allow lateral forces applied thereon to be diminished.

The cutting blade 24 has been shown and described as a hexagon blade. Other shapes of multi-sided cutting blades, such as triangular and pentagonal, can be used with the turf plug making tool. Wedges attached to the blades retain cut turf plugs within the blades.

While there has been shown and described a preferred embodiment of the turf repair tool of the invention, it is understood that changes in the structure, arrangement of structure and angular relationship of the side walls of the cutting blade, and materials may be made by those skilled in the art without departing from the invention. The invention is defined in the following claims.

I claim:

1. A turf plug making tool comprising: a generally rectangular base having a front bar and a back bar connected to end bars surrounding a central opening, a first upright leg attached to the front bar, a second upright leg attached to the back bar in transverse alignment with the first leg, said first leg having a first inwardly curved top section, said second leg having a second inwardly curved top section, transverse handle means connected to the first and second top sections, a hexagon shaped blade means attached to the base extending through the opening of the base, said blade means surrounding an opening whereby when a downward force is applied to the handle means to move the blade means into an area of turf a hexagon shaped turf plug is cut and located in said opening, a plurality of wedge members secured to the blade means operable to retain a plug within the opening of the blade means, and plug holding means having a pair of upright rods attached to the blade means, and a ring located above the blade connected to the legs and the rods whereby when the blade means is used to cut successive plugs the wedge members, ring, rods and legs cooperate to hold a plurality of turf plugs in a stacked relation.

2. The tool of claim 1 wherein: the end bars of the base are laterally spaced outwardly from the blade means.

3. The tool of claim 1 wherein: the handle means comprises a bar member attached to the first and second top sections, said bar member having outer ends and a longitudinal axis located normal to a vertical plane extending through the first and second legs, and hand grips mounted on the outer ends of the bar member.

4. The tool of claim 1 wherein: the blade means has vertical side walls and an open top whereby when a turf plug is cut from an area of turf, the turf plug in the opening moves up through the open top.

5. The tool of claim 4 wherein: each of the vertical side walls has an inner surface having a lower outwardly beveled edge, the inner surface accommodating at least one of the wedge members.

6. The tool of claim 5 wherein: each of the wedge members has a generally flat upper edge and an outwardly inclined lower edge.

7. The tool of claim 1 wherein: the rods are attached to opposite sides of the blade circumferentially spaced from the first and second legs.

8. The tool of claim 1 wherein: the ring has a larger diameter than the lateral distance between opposite portions of the blade.

9. A turf plug making tool comprising: a base having a central opening, upright leg means attached to the base, said leg means having an upper portion, handle means secured to the upper portion of the leg means, cutting means attached to the base for cutting a turf plug having more than four sides, said cutting means including blade means extending downwardly from the base operable to cut a portion of turf into said multi-sided turf plug, means for holding at least one multi-sided turf plug whereby an area of damaged turf can be repaired with healthy multi-sided turf plugs, said means for holding at least one plug including a plurality of sedges secured to an inside surface of the blade means, a ring connected to the leg means, and a pair of upright rods connected to the ring and the blade means.

10. The tool of claim 9 wherein: the leg means includes a pair of legs, each leg having a top portion, said handle means being secured to the top portion of each leg.

11. The tool of claim 9 wherein: the blade means has vertical side walls surrounding an opening having an open top whereby when a turf plug is cut from the area of turf it is located in said opening and the plug in the opening moves up through the open top.

12. The tool of claim 9 wherein: the inner surface has a lower beveled cutting edge.

13. The tool of claim 12 wherein: each of the wedges has a generally flat upper edge and an outwardly and upwardly inclined lower edge.

14. The tool of claim 9 wherein: the ring has a diameter larger than the distance between opposite portions of the blade means.

15. A turf plug making tool comprising: a base, leg means attached to the base, handle means secured to the leg means, cutting means attached to the base adjacent the leg means operable to cut multi-sided turf plugs having more than four sides from an area of turf, each of the plugs having adjacent obtuse angular side surfaces whereby adjacent plugs can be arranged in a close fit relation to repair an area of damaged turf, a plurality of wedge members attached to the cutting means to hold a turf plug in the cutting means, a pair of upright rods secured to the cutting means adjacent the wedge members, and a ring connected to the rods and the leg means to retain stacked turf plugs in said tool.

16. The tool of claim 15 wherein: the leg means includes a first upright leg attached to a first portion of the base, and a second upright leg attached to a second portion of the base, the first leg having a first inwardly inclined top section connected to a second inwardly inclined top section on the second leg.

17. The tool of claim 15 wherein: the cutting means includes a hexagon shaped blade means having generally vertical side walls, each of the side walls having an inner surface with a lower beveled edge.

18. The tool of claim 15 wherein: each of the wedge members has a generally flat top edge and an outwardly inclined lower edge.

19. The tool of claim 15 wherein: the rods are attached to opposite side portions of the cutting means and circumferentially spaced from the leg means.

20. A turf plug making tool comprising: a base, upright leg means secured to the base, cutting means secured to the base below the leg means, said cutting means having a multi-sided cutter having side walls with inside surfaces surrounding an opening having an open top and open bottom, whereby when the cutter is moved into turf said side walls surround a turf plug, means secured to at least one of said inside surfaces for retaining the turf plug cut with the cutter within said opening, said turf plug being moved upwardly when the cutter is used to make a second turf plug, and means for holding stacked plugs adjacent said leg means including upright rod means secured to the base, and ring means secured to the leg means and rod means above the base whereby cut turf plugs can move upwardly adjacent the rod means and leg means upon cutting of another turf plug with the cutter by moving the cutter downwardly into turf.

21. The tool of claim 20 wherein: the side walls of the cutter comprise generally flat members having substantially the same length and a lower knife edge.

22. The tool of claim 20 wherein: said means secured to at least one of said inside surfaces comprise at least one wedge member extended inwardly from an inside surface engageable with the cut turf plug located within said opening to retain the turf plug therein.

23. The tool of claim 22 wherein: a plurality of wedge members are secured to inside surfaces of the side walls, each wedge member engageable with separate portions of the cut turf plug located within the opening to retain the turf plug therein.

24. The tool of claim 20 including: handle means secured to the leg means usable to facilitate manual movement of the cutter into turf to cut a turf plug.

25. A turf plug making tool comprising: a base, upright leg means attached to the base, handle means connected to the leg means, a hexagon shaped blade means attached to the base, said blade means surrounding an opening whereby when a downward force is applied to the handle means to move the blade means into an area of turf a hexagon shaped turf plug is cut and located in said opening, plug retaining means secured to the blade means operable to retain a plug within the opening of the blade means, and upright plug holding means attached to the blade means whereby when the blade means is used to cut successive plugs the plug retaining means, plug holding means and leg means cooperate to hold a plurality of turf plugs in a stacked relation.

26. The tool of claim 25 wherein: the blade means has vertical side walls and an open top whereby when a turf plug is cut from an area of turf, the turf plug in the opening moves up through the open top into holding relation with the plug holding means.

27. The tool of claim 26 wherein: each of the vertical side walls has an inner surface having a lower outwardly beveled edge, the inner surface accommodating said plug retaining means.

28. The tool of claim 25 wherein: said plug retaining means comprises wedge members, each of the wedge members having a generally flat upper edge and an outwardly and upwardly inclined lower edge.

29. The tool of claim 25 wherein: the plug retaining means includes inwardly directed edge means on the blade means to retain a plug within the opening of the blade means.

* * * * *